US010691955B1

(12) United States Patent
Correia Gracio et al.

(10) Patent No.: US 10,691,955 B1
(45) Date of Patent: Jun. 23, 2020

(54) AIRCRAFT CABIN ARTIFICIAL INTELLIGENCE CREW ASSISTANCE

(71) Applicant: The Boeing Company, Chicago, IL (US)

(72) Inventors: Bruno J. Correia Gracio, Madrid (ES); Stephen Sweeney, Madrid (ES)

(73) Assignee: BOEING COMPANY, THE, Chicago, IL (US)

(*) Notice: Subject to any disclaimer, the term of this patent is extended or adjusted under 35 U.S.C. 154(b) by 0 days.

(21) Appl. No.: 16/372,845

(22) Filed: Apr. 2, 2019

(51) Int. Cl.
| | |
|---|---|
| *G06Q 10/06* | (2012.01) |
| *G06K 9/00* | (2006.01) |
| *G06N 5/04* | (2006.01) |
| *G06K 9/62* | (2006.01) |
| *H04N 5/265* | (2006.01) |
| *B64D 11/00* | (2006.01) |
| *B64D 47/08* | (2006.01) |
| *B64D 45/00* | (2006.01) |
| *H04N 5/247* | (2006.01) |
| *G06Q 30/02* | (2012.01) |

(52) U.S. Cl.
CPC ...... *G06K 9/00771* (2013.01); *B64D 11/0015* (2013.01); *B64D 45/00* (2013.01); *B64D 47/08* (2013.01); *G06K 9/6253* (2013.01); *G06K 9/6256* (2013.01); *G06N 5/04* (2013.01); *H04N 5/247* (2013.01); *H04N 5/265* (2013.01); *G06Q 30/0241* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,296,860 | B2* | 5/2019 | Agrawal | G06K 9/00771 |
| 2010/0253781 | A1* | 10/2010 | Sasson | B64D 45/0015 |
| | | | | 348/148 |
| 2013/0160061 | A1* | 6/2013 | Koch | G07C 5/0866 |
| | | | | 725/76 |
| 2016/0247101 | A1* | 8/2016 | Agrawal | G06K 9/00771 |
| 2017/0233098 | A1* | 8/2017 | Gerard | B64D 45/0015 |
| | | | | 348/159 |
| 2017/0283086 | A1* | 10/2017 | Garing | B64D 11/0638 |
| 2019/0112050 | A1* | 4/2019 | Ibrahim | G06N 20/00 |
| 2019/0177004 | A1* | 6/2019 | Skelly | B64D 47/08 |
| 2019/0197748 | A1* | 6/2019 | Vandewall | G06F 9/453 |
| 2019/0308744 | A1* | 10/2019 | Riedel | B64D 11/0015 |
| 2020/0047888 | A1* | 2/2020 | Sivignon | B64D 11/0691 |

* cited by examiner

*Primary Examiner* — An T Nguyen
(74) *Attorney, Agent, or Firm* — Parsons Behle & Latimer

(57) ABSTRACT

A method may include receiving an image from at least one camera positioned within an aircraft cabin. The method may further include associating the image with a category and a corresponding probability value based on a predictive model. The method may include displaying an alert at a cabin crew station within the aircraft cabin when the probability value is greater than a threshold probability value. A system may include at least one camera positioned within an aircraft cabin, a cabin crew station, and a processor positioned within an aircraft avionics bay. The processor may be configured to receive an image from the at least one camera, associate the image with a category and a probability value based on a predictive model, and generate an alert at the cabin crew station when the probability value is greater than a threshold probability value.

20 Claims, 4 Drawing Sheets

AIRCRAFT CABIN ARTIFICIAL INTELLIGENCE CREW ASSISTANCE

FIELD OF THE DISCLOSURE

This disclosure is generally related to artificial intelligence, and in particular to aircraft cabin artificial intelligence crew assistance.

BACKGROUND

During a commercial flight, cabin crew members perform many functions, including ensuring that passengers are safe and comply with safety rules. In order to perform these duties, crew members make periodic inspections of the cabin. For example, crew members may verify that seatbelts have been fastened, tray tables are stowed, seat backs are in their upright positions, etc. Crew members may also periodically monitor the cabin to determine whether passengers are complying with flight safety rules.

Awareness of the state of the cabin typically relies on periodical visual inspections conducted by the cabin crew members. For example, during turbulence, a cabin crew may inspect the entire cabin visually in order to identify a small subset of passengers that may not be following the safety instructions given to them. These inspections can put the cabin crew at risk and cause injuries to them and also to passengers. In some cases, sensors may be placed in each of the seatbelt laches and pressure sensors may be used to determine whether a passenger is standing or sitting. However, these sensors may increase aircraft weight and ultimately the cost of flight operations. Further, these solutions generate additional wiring which may add to the weight of an aircraft and could cause unanticipated electromagnetic effects.

SUMMARY

Disclosed herein is an artificial intelligence assistant that may enable cabin crew members to pin-point specific situations in the cabin and address them directly instead having to rely on cabin visual inspections. The disclosed systems and methods may also help identify potential threatening situations and promptly inform cabin and flight crew before the situations escalate to higher risk levels.

In an embodiment, a method includes receiving an image from at least one camera positioned within an aircraft cabin. The method further includes associating the image with a category and a corresponding probability value based on a predictive model. The method also includes displaying an alert at a cabin crew station within the aircraft cabin when the probability value is greater than a threshold probability value.

In some embodiments, the category corresponds to a seatbelt state, a tray table state, a seat occupancy state, or passenger assistance matters. In some embodiments, the method includes training the predictive model using a set of training images associated with the category. In some embodiments, the alert includes an identification of the category, a seat location, the image, a video, or any combination thereof. In some embodiments, the method includes receiving user input at the cabin crew station in response to the alert, the user input indicating that the image corresponds to the category or that the image does not correspond to the category, and updating the predictive model based on the image and the user input. In some embodiments, the method includes receiving user input at the cabin crew station in response to the alert, the user input including a communication, and sending the communication to a passenger information system. In some embodiments, the passenger information system is an in-flight entertainment system.

In some embodiments, the at least one camera detects infrared light, visual light, or a combination thereof to generate the image in bright and low-light conditions. In some embodiments, the at least one camera is part of a camera array installed in a ceiling of the aircraft cabin. In some embodiments, the aircraft cabin includes between one and three rows of seats per camera within the camera array. In some embodiment, the method includes generating the image by fusing multiple images from multiple cameras of the camera array. In some embodiments, the method includes providing an interactive virtual walkthrough of the aircraft cabin at the cabin crew station using the camera array. In some embodiments, the camera array is wirelessly networked together to send the image to a processor positioned within an avionics bay.

In an embodiment, a system includes at least one camera positioned within an aircraft cabin. The system further includes a cabin crew station. The system also includes a processor positioned within an aircraft avionics bay. The processor is configured to receive an image from the at least one camera. The processor is further configured to associate the image with a category and a probability value based on a predictive model. The processor is also configured to generate an alert at the cabin crew station when the probability value is greater than a threshold probability value.

In some embodiments, the cabin crew station is configured to receive user input in response to the alert, the user input indicating that the image corresponds to the category or that the image does not correspond to the category, and wherein the processor is configured to update the predictive model based on the image and the user input. In some embodiments, the system includes a passenger information system, where the cabin crew station is configured to receive user input in response to the alert, the user input including a communication, and to send the communication to the passenger information system.

In some embodiments, the system includes a camera array installed in a ceiling of the aircraft cabin, where the at least one camera is part of the camera array. In some embodiments, the camera array is wirelessly networked together to send the image to the processor.

In an embodiment, a method includes receiving multiple images during a flight from at least one camera positioned within an aircraft cabin. The method further includes associating the multiple images with categories and corresponding probability values based on a predictive model. The method also includes displaying alerts at a cabin crew station within the aircraft cabin when one or more of the multiple images is associated with a category having a corresponding probability value that is greater than a threshold probability value.

In some embodiments, the method includes generating data that associates the categories with the flight, storing the data in a database, and adjusting marketing parameters, security parameters, service parameters, or a combination thereof based on the data.

Figure 1:
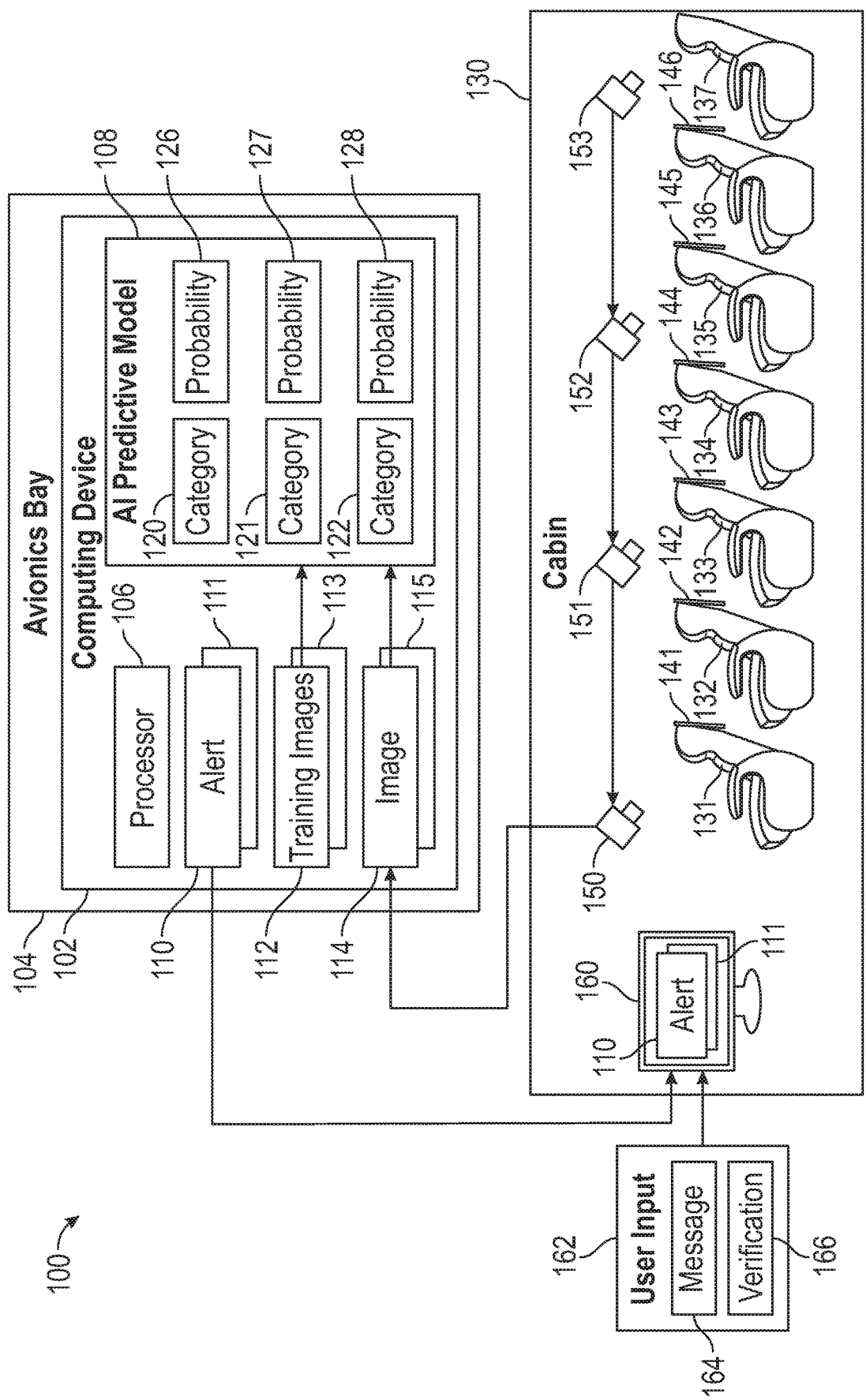
FIG. 1 depicts an embodiment of a system for artificial intelligence crew assistance.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

Referring to FIG. 1, a block diagram of an embodiment of a system 100 for artificial intelligence crew assistance is depicted. The system 100 may include a computing device 102, which may be positioned within an avionics bay 104 of an aircraft. Although the system 100 is described with reference to implementation within an aircraft, other applications are possible.

The computing device 102 may include a processor 106 and an implementation of an artificial intelligence predictive model 108. The processor 106 may include a central processing unit (CPU), a graphical processing unit (GPU), a digital signal processor (DSP), a peripheral interface controller (PIC), or another type of microprocessor. It may be implemented as an integrated circuit, a field programmable gate array (FPGA), an application specific integrated circuit (ASIC), a combination of logic gate circuitry, other types of digital or analog electrical design components, or the like, or combinations thereof. In some embodiments, the processor 106 may be distributed across multiple processing elements, relying on distributive processing operations.

Further, the processor 106 may include memory such as random-access memory (RAM), read-only memory (ROM), magnetic disk memory, optical disk memory, flash memory, another type of memory capable of storing data and processor instructions, or the like, or combinations thereof. In some embodiments, the memory, or portions thereof, may be located externally or remotely from the rest of the processor 106. The memory of the processor 106 may store instructions that, when executed by the processor 106, cause the processor 106 to perform operations. The operations may correspond to any operations described herein.

The artificial intelligence predictive model 108 may include any artificial intelligence model usable to associate an image 114 with categories 120-122 and predict probability values 126-128 indicating probabilities that the image 114 corresponds to the categories 120-122. For example, the predictive model 108 may include decision trees, association rules, other types of classification processes, or combinations thereof. It may be implemented as support vector machine networks, Bayesian networks, other types of classification network systems, or combinations thereof.

The predictive model 108 is depicted as being configured to associate the image 114 with a first category 120, a second category 121, and a third category 122, and to generate a first probability value 126 indicating a probability that the image 114 falls into the first category 120, a second probability value 127 indicating a probability that the image 114 falls into the second category 121, and a third probability value 128 indicating a probability that the image 114 falls into the third category 122. Although three categories 120-122 are depicted, more or fewer than three categories may be contemplated by the predictive model 108. The types of categories 120-122 may depend on the intended application. In an embodiment, the categories may correspond to a seatbelt state (e.g., seatbelt unfastened), a tray table state (e.g., tray table down), a seat occupancy state (e.g., seat unoccupied), or a passenger assistance matter.

The artificial intelligence predictive model 108 may be trained using a set of training images 112. The training may occur at a category level. For example, the training images 112 may have been verified to ensure that they are associated with the first category 120. During training, the predictive model 108 may be modified to recognize traits and features common among the training images 112 that can help associate the image 114 with the first category 120. Other training images 113 may be used to train the predictive model 108 regarding the second category 121 and the third category 122. The training may occur remotely from the computing device 102. For example, the predictive model 108 may be pretrained and uploaded to the computing device 102 (e.g., from a central repository).

The system 100 may further include a camera array 150-153 and a cabin crew station 160 positioned within a cabin 130 of the aircraft. The camera array 150-153 may be positioned in a ceiling of the aircraft cabin 130 and may include a first camera 150, a second camera 151, a third camera 152, and a fourth camera 153. Although four cameras are depicted, the camera array 150-153 may include more or fewer than four cameras. The camera array 150-153 may be positioned to capture imagery associated with each seat in the aircraft cabin 130. For example, the aircraft cabin 130 may include seats 131-137 arranged in rows, having between one and three rows per camera within the camera array 150-153. The camera array 150-153 may be configured to generate the image 114. In practice, each camera of the camera array 150-153 may continuously generate images, such that at any given time, the image 114 may have come from any of the cameras of the camera array 150-153. In some embodiments, the image 114 may be fused from multiple images received from the camera array 150-153.

Each camera of the camera array 150-153 may be configured to detect infrared light, visual light, or a combination thereof in order to generate the image 114 in bright and low-light conditions. Further, the camera array 150-153 may be wirelessly networked in order to reduce the weight associated with wiring. Further, to avoid interfering with sensitive communication equipment each camera of the camera array 150-153 may have a communication range that only reaches one or two other cameras of the camera array 150-153. For example, the fourth camera 153 may only be in communication range with the third camera 152 and the second camera 151. In order to transmit the image 114 to the computing device 102 from the fourth camera 153, the cameras 150, 151, 152 may be used. In this way, the camera array 150-153 may function as a network of wireless repeaters or a mesh wireless network.

The cabin crew station 160 may be capable of displaying alerts to flight crew members and receiving input as well. In some embodiments, the cabin crew station 160 is a touchscreen device, capable of displaying output and receiving input through a screen. The cabin crew station 160 may be fixed within the aircraft cabin 130 or, in some embodiments, the cabin crew station 160 may be a mobile touch screen device. The cabin crew station 160 may be networked with the computing device 102 and with a plurality of passenger information systems 141-146. In some embodiments, the passenger information systems 141-146 may be in-flight entertainment systems.

During operation, the predictive model 108 may first be trained using the set of training images 112. Each of the set of training images 112 may be associated with one of the categories 120-122. Additional sets of training images 113 may be associated with the others. The training may occur at the computing device 102 or at another computing device. If training of the predictive model 108 occurs remotely, the predictive model 108 may be uploaded to the computing device 102 before a flight.

During a flight, at least one image 114 may be received from at least one camera 150 of the camera array 150-153 positioned within the aircraft cabin 130. In practice, multiple images 114, 115 will be received continuously in order to monitor the cabin 130 throughout the flight. Further, images from different cameras of the camera array 150-153 may be fused to generate the image 114.

The image 114 may be associated with one of the categories 120-122 and its corresponding probability value 126-128 may be generated based on the predictive model 108. When the probability value 126-128 is greater than a threshold probability value an alert 110 may be generated at the computing device 102 and displayed at the cabin crew station 160. In response to the alert 110, user input 162 may be received from a flight crew member at the cabin crew station 160. The user input 162 may include a feedback verification 166 that indicates whether the image 114 actually corresponds to the category 120-122 that triggered the alert, or whether the image does not correspond to the category 120-122. Based on the feedback verification 166, the predictive model 108 may be updated through further training.

The user input 162 may include a message 164 in response to the alert 110, the message 164 may be sent to one of the passenger information systems 141-146. This may allow a flight crew to communicate with passengers without having to walk through the aircraft cabin 130. The camera array 150-153 may also enable further functionality at the cabin crew station 160, such as by providing an interactive virtual walkthrough of the aircraft cabin 130. As multiple images 114, 115 are processed, multiple alerts 110, 111 may be generated.

A benefit of the system 100 is that by monitoring the aircraft cabin 130 through the camera array 150-153, a flight crew may make fewer trips through the aircraft cabin 130. This may be particularly beneficial during times where there is a heightened risk to crew members, such as during take-off and landing, during turbulence, or during inclement weather. Another benefit of the system 100 is that the computing device 102 may assist crew members in assessing a state of the aircraft cabin 130 and in identifying passenger concerns quickly and safely. For example, the categories 120-122 may relate to seatbelt statuses, tray table statuses, passenger assistance matters, etc. By identifying potential passenger safety situations and alerting crew members, safety issues may be addressed quickly and appropriately. The system 100 may also require fewer sensors and wiring than systems that rely on sensors to determine a state of seatbelts and tray tables, which may result in lower costs and a lower aircraft weight. Other benefits may exist.

Figure 2:
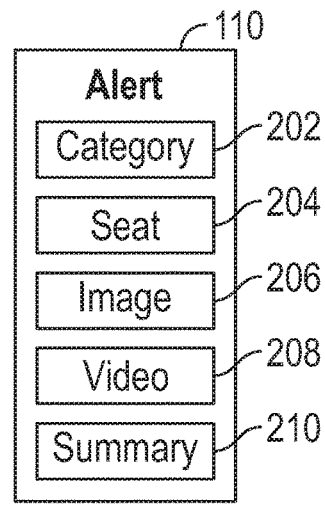
FIG. 2 depicts an embodiment of an alert generated by a system for artificial intelligence crew assistance.

Referring to FIG. 2, an embodiment of an alert 110 is depicted. The alert 110 may include a category 202 associated with an image (e.g., the image 114 of FIG. 1). The category 202 may be indicating of a state of one or more features of an aircraft cabin (e.g., seat belts, seat backs, tray tables) or of a passenger assistance matter. Because the alert 110 is generated in response to a high probability of correlation between the image and the category 202, the category 202 may inform crew members of a situation or problem developing in the aircraft cabin.

The alert 110 may also include a seat identification 204 to provide an indication of where a situation may be occurring. An image 206 and/or a short video clip 208 may also be provided to help flight crew members identify the situation. In some cases, the image 206 may correspond to the image 114 of FIG. 1.

In some instances (e.g., during boarding or during cabin preparation for take-off or landing) a summary 210 may be provided. The summary 210 may indicate a number of seats that are unoccupied, a number of seat belts that are unfastened, a number of tray tables that are down, etc. The summary 210 may also indicate a number of passengers predicted to be ready for in-flight services in order to enable crew members to determine an optimal time for the services. Other alert features are also possible.

Figure 3:
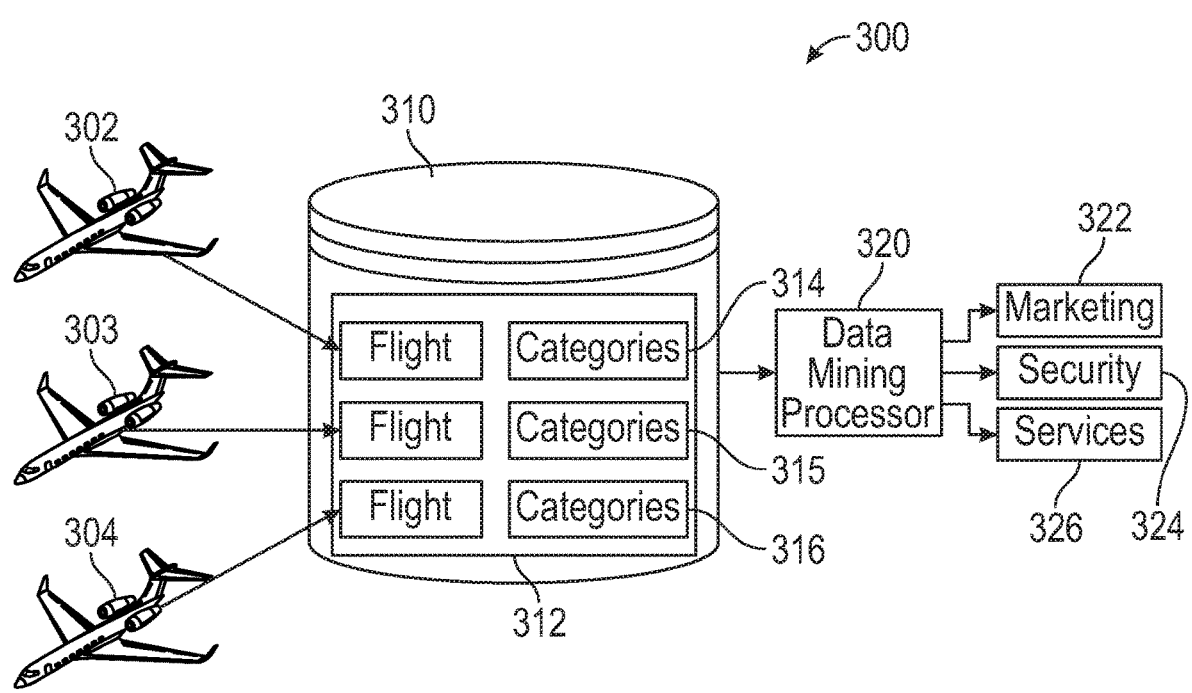
FIG. 3 depicts an embodiment of a system for analyzing artificial intelligence crew assistance data.

Referring to FIG. 3, an embodiment of a system 300 for analyzing artificial intelligence crew assistance data is depicted. The system 300 may include a database 310 and a data mining processor 320. The database may store data 312 associated with multiple flights 302, 303, 304. For example, for each of the flights 302-304, multiple images may be received from at least one camera positioned within an aircraft cabin. The multiple images may be associated with categories 314, 315, 316 for each of the flight 302-304. The data 312 may be generated and may associate the categories 314, 315, 316 with the flights 302-304. The data 312 may then be stored at the database 310.

The data mining processor 320 may be configured to analyze the data 312. Based on various data mining techniques, parameters related to how the flights 302-304 may be changed. For example, marketing parameters 322, security parameters 324, service parameters 326, or a combination thereof may be adjusted based on the data 312.

A benefit of the system 300 is that an airline or other entity may rely on the data 312 to determine how to more effectively serve its clientele. For example, they may be able to distinguish between passenger service request patterns during long haul flights and short haul flights and adjust services to accommodate those requests. Other advantages may exist.

Figure 4:
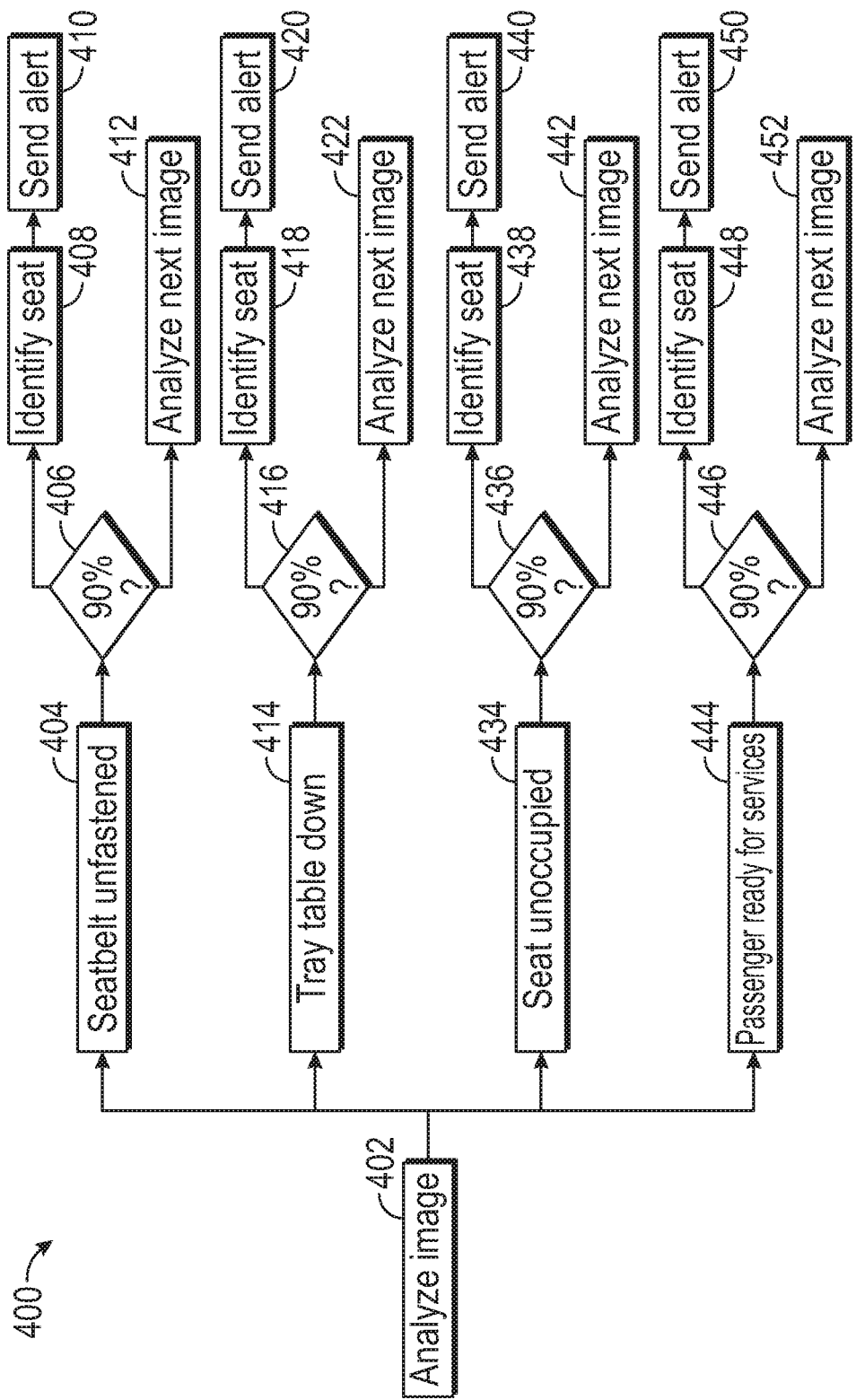
FIG. 4 depicts an embodiment of a method for analyzing an image.

Referring to FIG. 4, an embodiment of a method 400 for analyzing an image is depicted. The method 400 may be performed by the computing device 102 of FIG. 1.

The method 400 may start by analyzing an image, at 402. Analyzing the image may include analyzing several aspects of the image to determine whether the image is related to various categories. For example, the method 400 may include determining a probability that the image is associated with a seatbelt being unfastened, at 404. When the probability is determined to be greater than a threshold probability (e.g., 90%), at 406, the method 400 may include identifying a seat associated with the unfastened seatbelt, at 408, and sending an alert indicating the seat, at 410. When the probability is determined to be lower than the threshold probability, at 406, the method 400 may include analyzing a next image, at 412.

The method 400 may also include determining a probability that the image is associated with a tray table being down, at 414. When the probability is determined to be greater than a threshold probability (e.g., 90%), at 416, the method 400 may include identifying a seat associated with the tray table, at 418, and sending an alert indicating the seat, at 420. When the probability is determined to be lower than the threshold probability, at 416, the method 400 may include analyzing a next image, at 422.

The method 400 may include determining a probability that the image is associated with a seat being unoccupied, at 434. When the probability is determined to be greater than a threshold probability (e.g., 90%), at 436, the method 400 may include identifying the unoccupied seat, at 438, and sending an alert indicating the seat, at 440. When the probability is determined to be lower than the threshold probability, at 436, the method 400 may include analyzing a next image, at 442.

The method 400 may further include determining a probability that the image is associated with a passenger who is ready for in-flight services, at 444. When the probability is determined to be greater than a threshold probability (e.g., 90%), at 446, the method 400 may include identifying a seat of the passenger, at 448, and sending an alert indicating the seat, at 450. When the probability is determined to be lower than the threshold probability, at 444, the method 400 may include analyzing a next image, at 452.

A benefit of the method 400 is that by identifying the situations in steps 404, 414, 434, 444, the method 400 may reduce the amount of time crew members spend moving about an aircraft cabin. The method 400 may be particularly helpful during times when it is unsafe to move about the cabin, such as during take-off and landing, or during turbulence. Other advantaged may exist.

Figure 5:
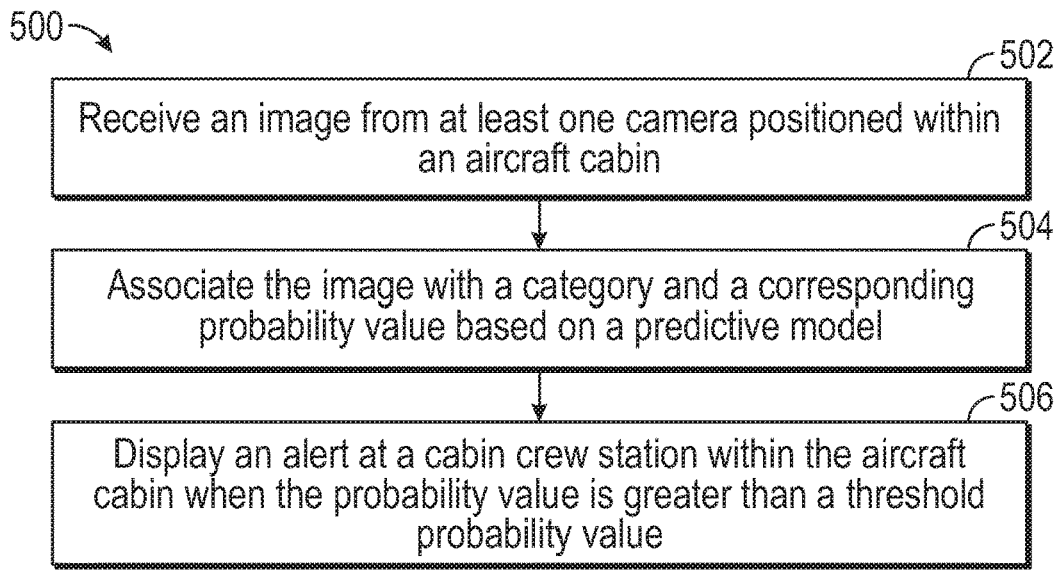
FIG. 5 depicts an embodiment of a method for artificial intelligence crew assistance.

Referring to FIG. 5, an embodiment of a method 500 for artificial intelligence crew assistance is depicted. The method 500 may include receiving an image from at least one camera positioned within an aircraft cabin, at 502. For example, the image 114 may be received at the computing device 102, or more particularly at the processor 106 of the computing device 102.

The method 500 may further include associating the image with a category and a corresponding probability value based on a predictive model, at 504. For example, the image 114 may be associated with the one or more of the categories 120-122 and probability values 126-128 may be generated indicating a probability that the image 114 corresponds to the associated categories.

The method 500 may also include displaying an alert at a cabin crew station within the aircraft cabin when the probability value is greater than a threshold probability value, at 506. For example, the alert 110 may be generated and displayed at the cabin crew station 160.

Figure 6:
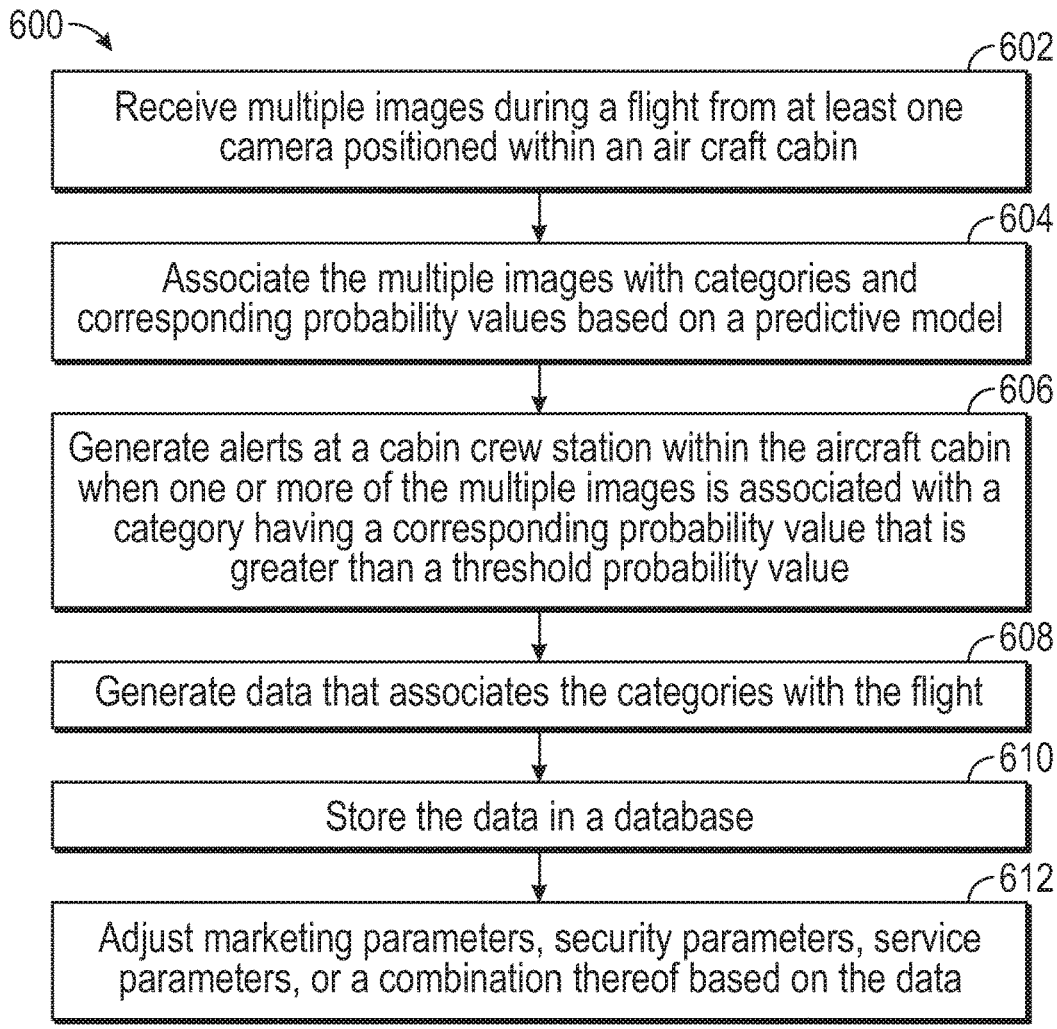
FIG. 6 depicts an embodiment of a method for artificial intelligence crew assistance.

Referring to FIG. 6 an embodiment of a method 600 for artificial intelligence crew assistance is depicted. The method 600 may include receiving multiple images during a flight from at least one camera positioned within an aircraft cabin, at 602. For example, the images 114, 115 may be received from at least one camera of the camera array 150-153.

The method 600 may further include associating the multiple images with categories and corresponding probability values based on a predictive model, at 604. For example, the multiple images 114, 115 may be associated with the categories 120-122 and the corresponding probability values 126-128.

The method 600 may also include generating alerts at a cabin crew station within the aircraft cabin when one or more of the multiple images is associated with a category having corresponding probability value that is greater than a threshold probability value, at 606. For example, when any of the images 114, 115 is associated with one of the categories 120-122 with probability values 126-128 that exceed threshold probability values, the alert 110 may be generated and displayed at the cabin crew station 160.

The method 600 may include generating data that associates the categories with the flight, at 608. For example, the data 312 may be generated to associate the categories 314 with the flight 302.

The method 600 may further include storing the data in a database, at 610. For example, the data may be stored at the database 310.

The method 600 may also include adjusting marketing parameters, security parameters, service parameters, or a combination thereof based on the data, at 612. For example, the data mining processor 320 may be used to determine how to adjust the marketing parameters 322, the security parameters 324, and the service parameters 326.

A benefit of the method 600 is that by storing data associating flights with categories, individual flights may be analyzed to determine how operational parameters for those flights may be improved. Other advantages may exist.

Although various embodiments have been shown and described, the present disclosure is not so limited and will be understood to include all such modifications and variations as would be apparent to one skilled in the art.

What is claimed is:

1. A method comprising:
   receiving an image from at least one camera positioned within an aircraft cabin;
   associating the image with a category and a corresponding probability value based on a predictive model; and
   displaying an alert at a cabin crew station within the aircraft cabin when the corresponding probability value is greater than a threshold probability value.

2. The method of claim 1, wherein the category corresponds to a seatbelt state, a tray table state, a seat occupancy state, or a passenger assistance matter.

3. The method of claim 1, further comprising:
   training the predictive model using a set of training images associated with the category.

4. The method of claim 1, wherein the alert includes an identification of the category, a seat location, the image, a video, or any combination thereof.

5. The method of claim 1, further comprising:
   receiving user input at the cabin crew station in response to the alert, the user input indicating that the image corresponds to the category or that the image does not correspond to the category; and
   updating the predictive model based on the image and the user input.

6. The method of claim 1, further comprising:
   receiving user input at the cabin crew station in response to the alert, the user input including a communication; and
   sending the communication to a passenger information system.

7. The method of claim 6, wherein the passenger information system is an in-flight entertainment system.

8. The method of claim 1, wherein the at least one camera detects infrared light, visual light, or a combination thereof.

9. The method of claim 1, wherein the at least one camera is part of a camera array installed in a ceiling of the aircraft cabin.

10. The method of claim 9, wherein the aircraft cabin includes between one and three rows of seats per camera within the camera array.

11. The method of claim 9, further comprising:
    generating the image by fusing multiple images from multiple cameras of the camera array.

12. The method of claim 9, further comprising:
providing an interactive virtual walkthrough of the aircraft cabin at the cabin crew station using the camera array.

13. The method of claim 9, wherein the camera array is wirelessly networked together to send the image to a processor positioned within an avionics bay.

14. A system comprising:
at least one camera positioned within an aircraft cabin;
a cabin crew station;
a processor positioned within an aircraft avionics bay, the processor configured to:
receive an image from the at least one camera;
associate the image with a category and a probability value based on a predictive model; and
generate an alert at the cabin crew station when the probability value is greater than a threshold probability value.

15. The system of claim 14, wherein the cabin crew station is configured to receive user input in response to the alert, the user input indicating that the image corresponds to the category or that the image does not correspond to the category, and wherein the processor is configured to update the predictive model based on the image and the user input.

16. The system of claim 14, further comprising:
a passenger information system, wherein the cabin crew station is configured to receive user input in response to the alert, the user input including a communication, and to send the communication to the passenger information system.

17. The system of claim 14, further comprising:
a camera array installed in a ceiling of the aircraft cabin, wherein the at least one camera is part of the camera array.

18. The system of claim 17, wherein the camera array is wirelessly networked together to send the image to the processor.

19. A method comprising:
receiving multiple images during a flight from at least one camera positioned within an aircraft cabin;
associating the multiple images with categories and corresponding probability values based on a predictive model; and
displaying alerts at a cabin crew station within the aircraft cabin when one or more of the multiple images is associated with a category having a corresponding probability value that is greater than a threshold probability value.

20. The method of claim 19, further comprising:
generating data that associates the categories with the flight;
storing the data in a database; and
adjusting marketing parameters, security parameters, service parameters, or a combination thereof based on the data.

\* \* \* \* \*